United States Patent
Hou et al.

(10) Patent No.: US 10,031,982 B2
(45) Date of Patent: Jul. 24, 2018

(54) RULE BASED DATA NORMALIZATION UTILIZING MULTI-KEY SORTING

(71) Applicant: Taiwan Semiconductor Manufacturing Company, Ltd., Hsin-Chu (TW)

(72) Inventors: Pao-Po Hou, Hsin-Chu (TW); Derek C. Tao, Hsin-Chu (TW); Liang-Yu Chen, Hsin-Chu (TW); Shaojie Xu, Hsin-Chu (TW); Kuoyuan Hsu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 788 days.

(21) Appl. No.: 14/582,510

(22) Filed: Dec. 24, 2014

(65) Prior Publication Data

US 2016/0188654 A1    Jun. 30, 2016

(51) Int. Cl.
  *G06F 17/50*    (2006.01)
  *G06F 17/30*    (2006.01)

(52) U.S. Cl.
  CPC .............. *G06F 17/30958* (2013.01)

(58) Field of Classification Search
  CPC .................................................... G06F 17/50
  USPC ........................................................... 716/106
  See application file for complete search history.

(56) References Cited

U.S. PATENT DOCUMENTS

| | | | |
|---|---|---|---|
| 2003/0188299 A1* | 10/2003 | Broughton | G06F 8/427 717/141 |
| 2010/0011016 A1* | 1/2010 | Greene | G06F 17/2264 704/10 |
| 2013/0238664 A1* | 9/2013 | Hsu | G06F 17/30592 707/797 |
| 2016/0110421 A1* | 4/2016 | Galle | G06F 17/30557 707/769 |

* cited by examiner

*Primary Examiner* — Mohammed Alam
(74) *Attorney, Agent, or Firm* — Haynes and Boone, LLP

(57) ABSTRACT

Methods and systems for efficient retrieval of neighboring measurement values in order to enable fast execution of rule-based error correction are disclosed. In one aspect, a method for data normalization using multi-key sorting is disclosed. In some embodiments, the method includes receiving, by a data organization engine, a set of uncorrected data including corresponding neighboring data. In various embodiments, the data organization engine organizes the uncorrected data by construction of a directed acyclic graph (DAG), where the DAG includes a plurality of nodes. In some embodiments, the data organization engine may traverse the plurality of nodes to retrieve the corresponding neighboring data. Upon retrieval of the neighboring data, a rule-based correction engine may correct the uncorrected data utilizing the retrieved corresponding neighboring data.

21 Claims, 11 Drawing Sheets

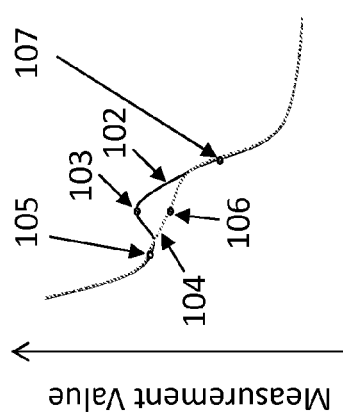
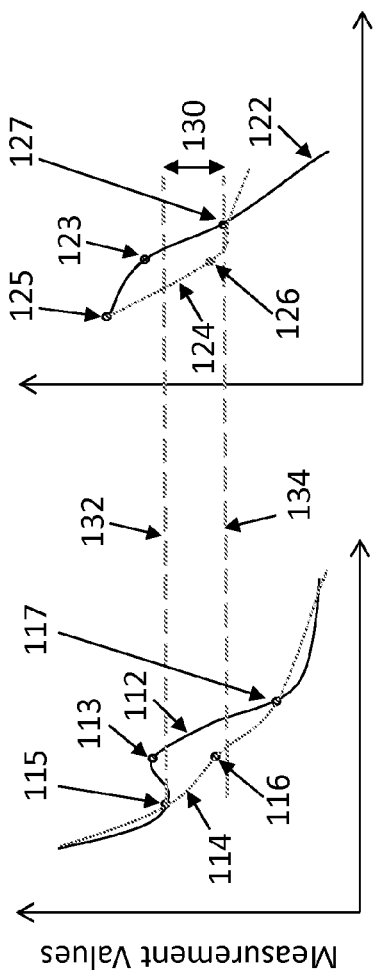

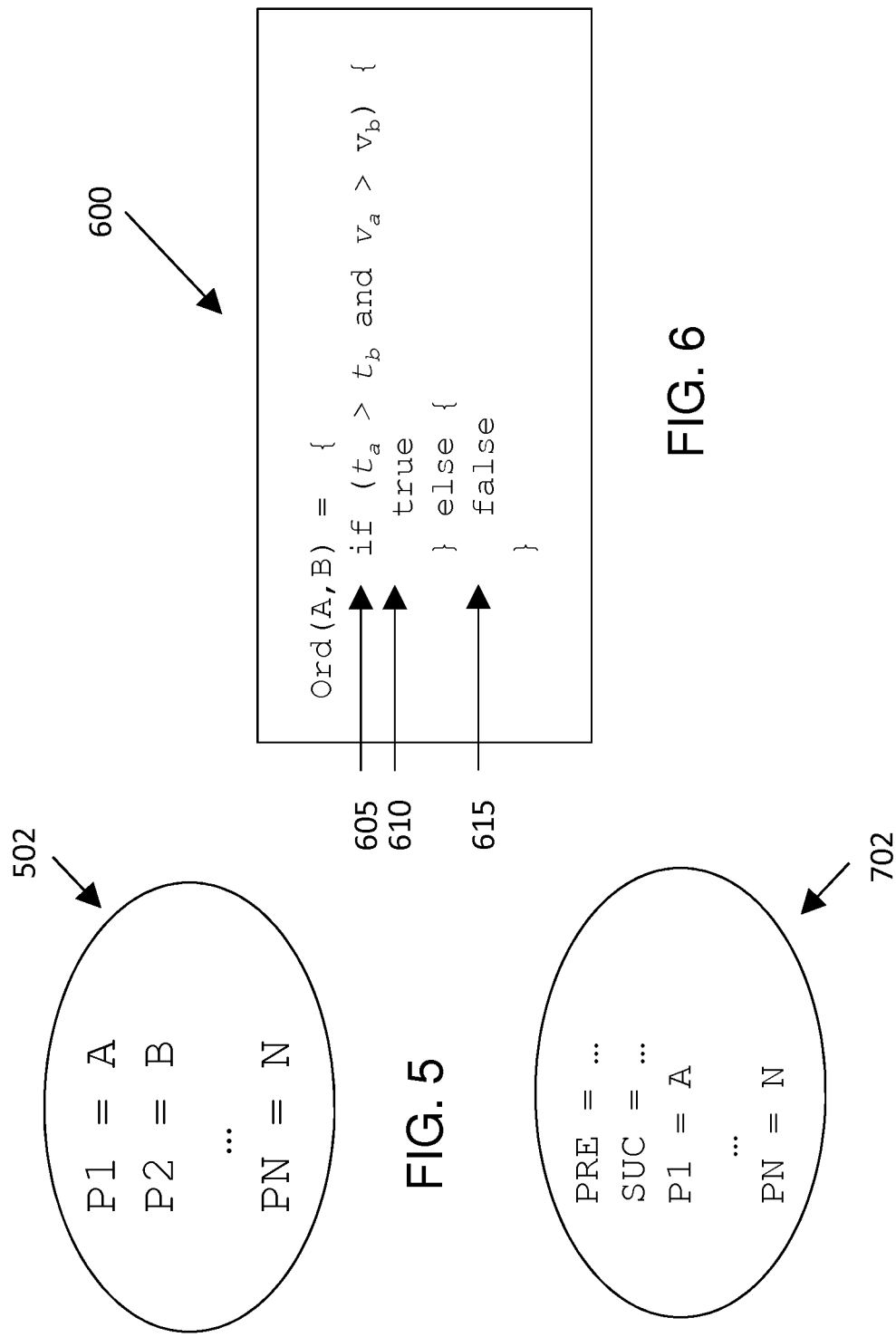

```
found = 0;
foreach (node in StartNodeArray) {
    if ( NewNode > node)) {
        found = 1;
        addNewNodeToDAG(NewNode, node);
    }
    if ($found == 0) {
        addNewNodeToStartNodeArray(NewNode);
    }
```

```
proc addNewNodeToDAG (new, root)
{
    found = 0;
    foreach node in root.successors) {
        if ( new == node) {
            $found = 1;
            next;
        }
        # find a node that is smaller than new
        if (new > node) {
            $found = 1;
            #insert into descendents of node
            addNewNodeToDAG (new, node)
        }
    }
    if ($found == 0) {
        #insert into successor of root
        root.successor += new;
        new.predecessor += root;
    }
}
```

FIG. 12

RULE BASED DATA NORMALIZATION UTILIZING MULTI-KEY SORTING

BACKGROUND

The electronics industry has experienced an ever increasing demand for smaller and faster electronic devices which are simultaneously able to support a greater number of increasingly complex and sophisticated functions. Accordingly, there is a continuing trend in the semiconductor industry to manufacture low-cost, high-performance, and low-power integrated circuits (ICs). Thus far these goals have been achieved in large part by scaling down semiconductor IC dimensions (e.g., minimum feature size) and thereby improving production efficiency and lowering associated costs. However, such scaling has also introduced increased complexity to the semiconductor manufacturing process, as well as to the design and simulation of such processes.

In some cases, simulated devices and/or circuits of early stage technologies may not always be entirely correct, for example, as design and/or manufacturing issues are being refined. Measurements, both simulated and physically measured, are an indispensable part of a technology qualification process. However, such measurements can be expensive (e.g., in terms of time and money). Thus, in some cases, a measurement data sample size may not be large enough to successfully employ statistical methods for data correction. Additionally, data correction techniques become even more challenging when dealing with measurements which are dependent on a plurality of measurement parameters, where each parameter exhibits its own trend. As one example, existing methods may require construction of sorted arrays requiring an excessive amount of time-consuming data accesses. In another example, costly manual data correction may need to be employed. Thus, existing data sorting and correction techniques have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A is single parameter measurement data illustrating neighboring data points;

FIGS. 1B and 1C are multiple parameter measurement data illustrating an allowed data range;

FIG. 5 is a schematic view of an object including a list of measurement or simulation parameters, in accordance with some embodiments;

FIG. 6 is an example of source code which may be used to implement an ordering function, according to some embodiments;

FIG. 7 is a schematic view of a node corresponding to the object of FIG. 5, including a predecessor list and a successor list, in accordance with some embodiments;

FIGS. 11 and 12 are examples of source code which may be used to construct a DAG, according to some embodiments.

DETAILED DESCRIPTION

Figure 2A:
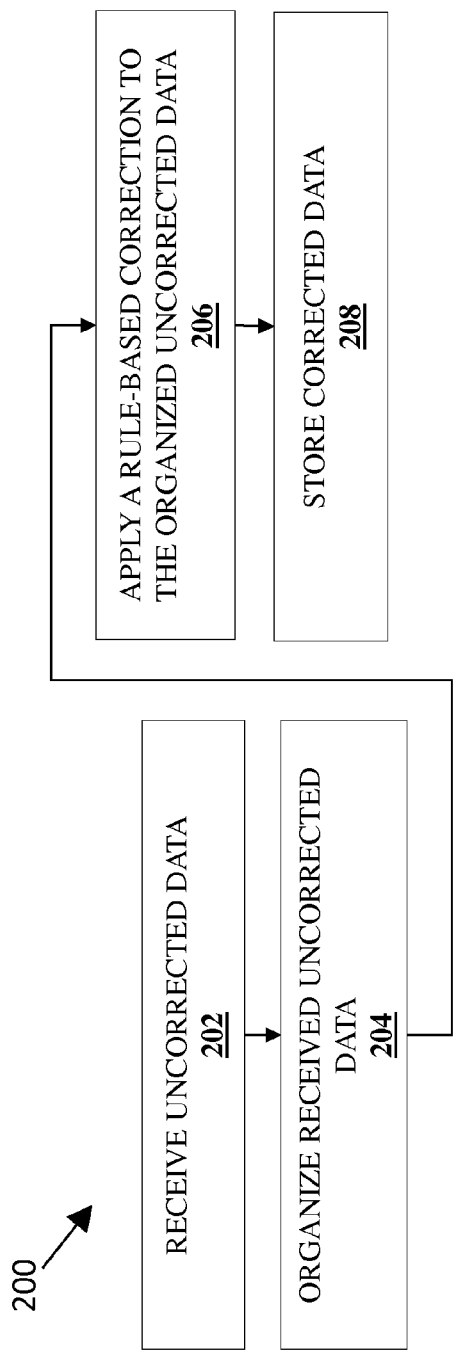
FIG. 2A is a flow chart illustrating an embodiment of a method for normalizing data using multi-key sorting.

It is understood that the following disclosure provides many different embodiments, or examples, capable of implementing different features. Specific examples of components and arrangements are described below to simplify and thus clarify the present disclosure. These are, of course, merely examples and are not intended to be limiting. In many instances, the features of one embodiment may be combined with the features of other embodiments. In addition, the present disclosure may repeat reference numerals and/or letters in the various exemplary embodiments. This repetition is for the purpose of simplicity and clarity and does not in itself dictate a relationship between the various embodiments and/or configurations discussed.

It is also noted that the present disclosure presents embodiments useful for the normalization of measurement values, such as for example, measurement values which are a function of a plurality of parameters. As used herein, the term "normalization" or "data normalization" is used to describe various embodiments where error-laden data is processed to correct errors, resulting in a more expected value (e.g., which follows an expected trend) for a given data set. In particular, embodiments disclosed herein may be particularly beneficial when a number of experiments, and thus the sample size of the experimental data collected from the experiments, is not sufficiently large to utilize statistical methods (e.g., regression analysis) for data correction. Although some examples discussed below may be described with reference to experiments related to semiconductor device design, simulation, manufacturing, or testing, it should be noted that the embodiments described herein may be equally applicable to experiments in any of a variety of fields, such as biological experiments, psychological experiments, physical experiments, chemical experiments, and virtual experiments (e.g., computer simulations or emulations). One of ordinary skill may recognize other types of experiments, as well as other data sorting or data correction techniques, which may benefit from aspects of the present disclosure.

The continuing trend in the semiconductor industry to manufacture low-cost, high-performance, and low-power integrated circuits (ICs) has thus far been realized in large part by scaling down semiconductor IC dimensions (e.g., minimum feature size) and thereby improving production efficiency and lowering associated costs. However, such scaling has also introduced increased complexity to the semiconductor manufacturing process, as well as to the design and simulation of such processes. In some examples, simulations of devices and/or circuits may contain errors, particularly for simulation of early stage technologies that have yet to be fully qualified. Whether simulated or physically measured, measurements are an important part of a technology development and qualification process. However, measurements can be expensive to perform, for example, in terms of time and money. Thus, in some instances, an insufficient number of measurements are taken and/or simulated to use statistical data correction methods, as described above. Data analysis become even more challenging when dealing with measurements which are dependent on a plurality of measurement parameters, where measurements (or simulations) taken as a function of each of the plurality of parameters each exhibit their own trend.

Due to the nature and quantity of available data, a rule-based method may be used to correct measured and/or simulated values. As used herein, the term "rule-based" or "ruled-based method" as in a "rule-based data correction method" refers to the normalization of data (i.e., processing to correct errors, as described above) according to a defined rule. In some embodiments, such rules may be pre-defined. However, in some cases, rules may be defined on-the-fly, meaning for example, rules may be defined during and/or after a data collection process. As one example of a rule, consider a plurality of data points N, with a selected subset of data points $N_1$, $N_2$, and $N_3$, where a rule is defined such that one or more of the selected subset of data points $N_1$, $N_2$, and $N_3$ is replaced by an average value of the data points within a particular subset of data points. As another example, consider a curve defined by a plurality of data points, and consider a window spanning a plurality of data points Wn of the curve. One or more rules may be defined to replace the data points Wn within the window with, for example, an average of data points in the window, a median of data points in the window, or with another value as defined by any of a plurality of rules. While some examples of rules that may be implemented in a rule-based data processing method have been provided, those skilled in the art in possession of the present disclosure will recognize other rules and/or other methods of data processing, while remaining within the scope of the present disclosure.

When determining appropriate rules to implement for effective data correction, data points which neighbor a particular data point (i.e., "neighboring data points") generally serve as a reliable guide as to the correct value of the particular data point. As used herein, "neighboring" data may include data points that are adjacent to and greater than, or adjacent to and less than, a particular data point of interest. By way of illustration, and with reference to the example of FIG. 1A, there is presented an example of an uncorrected arbitrary 'measurement value' versus an arbitrary 'parameter', represented by a curve 102. As merely one example, a 'measurement value', as used herein, may include a measurement (or simulation) of a semiconductor device leakage current value, and a 'parameter' may include any parameter upon which the measurement value depends, such as temperature, threshold voltage ($V_t$), etc. To be sure, the embodiments described herein are not meant to be limited in any way by such examples, and any examples provided herein are merely for purposes of illustration and for clarity of discussion. In various examples, curve 102 may represent either measured or simulated data. Consider, for example, that the curve 102 is expected to exhibit a generally monotonically decreasing trend. However, an erroneous data point 103, as illustrated in FIG. 1A, is detected which does not follow the expected trend of the curve 102. In some examples, a best guess of the corrected value of the erroneous data point 103 may be a value somewhere between the two neighboring data points 105, 107. Thus, in some embodiments, once the neighboring data points (e.g., points 105, 107) are identified, a defined rule may be applied to compute a corrected data point (e.g., corrected data point 106), as illustrated in FIG. 1A. As discussed above, such a rule may include computing an average value of the two neighboring data points; however, other rules may equally be used without departing from the scope of the present disclosure. In any case, considering the present example, identification of the data points 105, 107 neighboring the erroneous data point 103, and subsequent application of a data correction rule, results in a corrected curve 104 including the corrected data point 106 which follows the expected monotonically decreasing trend.

Expanding on the illustration of FIG. 1A, and with reference to the example of FIGS. 1B and 1C, there is presented an example of an uncorrected arbitrary 'measurement value' versus a plurality of arbitrary 'parameters'. In particular, the 'measurement value' is shown as a function of Parameter A and Parameter B in each of FIGS. 1B and 1C, respectively. The example of FIGS. 1B and 1C is provided to illustrate a multiple parameter experiment (or simulation). As merely one example, such a multiple parameter experiment may include the semiconductor device leakage current example, discussed above. Using that example, and merely for purposes of illustration, the 'measurement value' may include the device leakage current, Parameter A may include temperature, and Parameter B may include device threshold voltage ($V_t$). To be sure, device leakage current may depend on more than just two parameters (e.g., Parameters A and B), but the example has been simplified herein for purposes of discussion. Moreover, the examples described herein are not meant to limit any of the embodiments described herein beyond what is specifically recited in the claims that follow.

When analyzing and correcting such multiple parameter data sets, as opposed to the single parameter data set shown in FIG. 1A, multiple sets of neighboring data should be considered simultaneously. For example, consider curve 112 of FIG. 1B and curve 122 of FIG. 1C. In the illustrated examples, curves 112 and 122 may represent either measured or simulated data. In addition, consider for example, that the curves 112, 122 are expected to exhibit a particular trend (e.g., decreasing, increasing, linear, etc.). However, an erroneous data point 113 and an erroneous data point 123 are detected in each of the curves 112, 122, respectively, which do not follow the expected trend. Similar to the above example, data points 115, 117 neighboring the erroneous data point 113 are identified. Likewise, data points 125, 127 neighboring the erroneous data point 123 are identified. However, for the case of multiple parameter data sets, rather than individually correcting the data of either FIG. 1B or FIG. 1C separately, all neighboring data points for measurement values as a function of each parameter (i.e., data points 115, 117 for Parameter A and data points 125, 127 for Parameter B) of a given measurement should be considered simultaneously. For the example of a single parameter data set (FIG. 1), a best guess of the correct value of an erroneous data point was described as having a value somewhere between the two neighboring data points. For the case of the multiple parameter data sets of FIGS. 1B/1C, the neighboring data points (i.e., data points 115, 117 for Parameter A and data points 125, 127 for Parameter B) can be used to define an allowed data range 130, within which the corrected values for each of the erroneous data points 113, 123 should lie. For example, in some embodiments, boundaries 132, 134 of the allowed data range 130 may be defined by the neighboring data point having the greater measurement value for a first parameter (e.g., greater between neighboring data points 115, 117 for Parameter A), and by the neighboring data point having the lesser measurement value for a second parameter (e.g., lesser between neighboring data points 125, 127 for Parameter B). Thus, considering the example of FIGS. 1B/1C, the boundary 132 may be defined by the neighboring data point 115, which has a greater measurement value (than neighboring data point 117) for a first parameter (Parameter A), and the boundary 134 may be defined by the neighboring data point 127, which has a lesser measurement value (than neighboring data point 125) for a second parameter (Parameter B). In this way, the allowed data range 130 can be defined while considering both neighboring data sets of Parameter A and B simultaneously. While a particular example of using the neighboring data points to define an allowed data range has been provided, those skilled in the art in possession of the present disclosure will recognize other methods of utilizing such neighboring data points to define an allowed data range, while remaining within the scope of the present disclosure. As depicted in FIGS. 1B/1C, once the neighboring data points for each parameter of a multi-parameter experiment are identified and the allowed data range 130 is defined, a defined rule may be applied to compute a corrected curve 114 including corrected data point 116 (FIG. 1B) and a corrected curve 124 including corrected data point 126 (FIG. 1C). In the illustrated example, the corrected data points 116, 126 are within the allowed data range 130, and the corrected curves 114, 124 follow their expected trends. While an example of a multiple parameter data set including two parameters (Parameter A and Parameter B) has been provided, those skilled in the art will recognize that the methods described herein may be equally applicable to measurements having any number of parameters.

The methods shown and described above with reference to FIGS. 1A, 1B, and 1C for finding neighboring data points may be generally described as "data organization methods". As one can imagine, as a number of measurements (or simulations) and/or a number of parameters grow, such data organization methods will become increasingly complex and difficult. Thus, while suitable for some purposes, more efficient data organization methods may be desired. For example, a method for efficient retrieval of neighboring measurement values in order to enable fast execution of rules (e.g., in a rule-based error correction system) to normalize error-laden data sets may be appreciated. However, existing data organization methods may not meet this need. As an example, existing methods may organize data by constructing a plurality of sorted arrays. In some cases, a plurality of N sorted arrays may be constructed, where N is equal to a number of parameters in a given multiple parameter measurement. In various examples of existing techniques, such N sorted arrays may be sorted for example, using a bubble sorting algorithm, a quicksort algorithm, or other sorting algorithm as known in the art. However, such array sorting does not directly provide neighboring data points, as described above. Rather, in various examples, neighboring data points are found by painstakingly traversing the N arrays. Contrary to the examples of FIGS. 1A/1B/1C, data elements (i.e., data points) which are disposed immediately before or after a particular data element may not necessarily be a neighbor of a given data point. Instead, considering N sorted arrays as may be used in existing methods, at least N accesses are needed to gather all neighboring data points. Thus, existing data organization methods are considerably inefficient and time-consuming.

Embodiments of the present disclosure offer advantages over the existing art, though it is understood that other embodiments may offer different advantages, not all advantages are necessarily discussed herein, and no particular advantage is required for all embodiments. For example, embodiments discussed herein provide a method for rule-based data normalization using multi-key (i.e., multi-parameter) sorting. The embodiments described herein may be particularly advantageous when a measurement data sample size is not large enough to successfully employ statistical methods for data correction. Contrary to existing methods, embodiments of the present disclosure provide a method for efficient retrieval of neighboring measurement values in order to enable fast execution of rule-based error correction. Specifically, and in various embodiments, efficient retrieval of neighboring measurement values is accomplished by way of constructing a directed acyclic graph (DAG), which provides for gathering of all neighboring data points with a single access of the measured (or simulated) data. As described herein, a DAG may be used to represent multiple parameter measurement ordering relationships, enabling the efficient data retrieval described above. A DAG, as described herein, is a directed graph which does not contain any directed cycles (i.e., loops). Stated another way, a DAG may include a collection of nodes and directed edges (i.e., directed paths). As discussed in more detail below, directed edges can be used to represent relationships between nodes. In a DAG, all directed edges are contained in paths originating at a root node and terminating at one or more sinks (i.e., a node having no exiting edges). A list of predecessor nodes (i.e., a predecessor list) of a particular node within a DAG may include all nodes contained within a path between the root node and the particular node. Similarly, a list of successor nodes (i.e., a successor list) of a particular node within a DAG may include all nodes contained within a path between the particular node and a sink node. Additional details of DAG construction, including defining and ordering of DAG nodes, are provided below with reference to FIGS. 2-12. In some embodiments, all node ordering sequences can be found by traversing the constructed DAG. In particular, in accordance with various embodiments, all neighboring objects (e.g., all neighboring data points) of a particular object (e.g., of a particular data point) can be read off the predecessor list and successor list of its corresponding node. Thus, embodiments of the present disclosure provide a DAG for efficient collection of data (including neighboring measurement values), where one or more rules may be applied to such collected data to correct errors. In this manner, an efficient, rules-based method for error correction (e.g., of multiple parameter measurement data) may be provided. Those skilled in the art will recognize other benefits and advantages of the methods and systems as described herein, and the embodiments described are not meant to be limiting beyond what is specifically recited in the claims that follow.

Figure 2B:
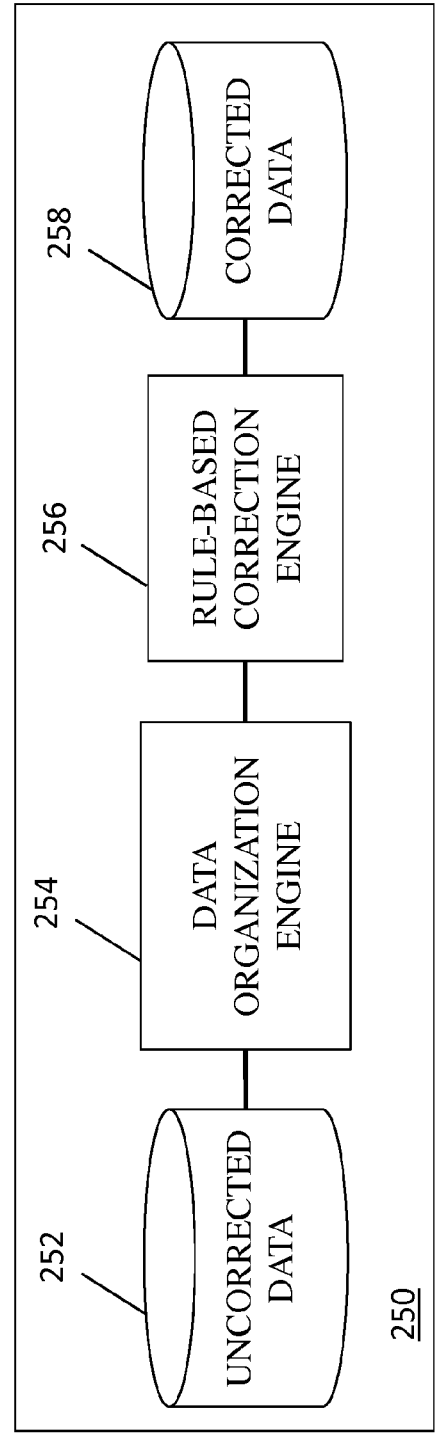
FIG. 2B is a schematic view illustrating an embodiment of a data normalization system for implementing the method of FIG. 2A.

Referring now to FIG. 2A, illustrated is a method 200 of data normalization using multi-key sorting, in accordance with embodiments of the present disclosure. In some embodiments, the method 200 may be used to sort uncorrected measurement (or simulation) data, apply a rule-based correction to the sorted data, and generate corrected data. It is noted that the steps of method 200, including any descriptions given with reference to FIG. 2B, are merely exemplary and is not intended to be limiting beyond what is specifically recited in the claims that follow.

The method 200 begins at block 202 where uncorrected measurement (or simulation) data is received. With reference to FIG. 2B, illustrated therein is an embodiment of a system 250 for implementing the rule-based data normalization methods disclosed herein. In particular, in various embodiments, the system 250 may be used to implement the method 200. In some examples, and in an embodiment of block 202 of the method 200, the system 250 may receive uncorrected measured (or simulated) data and store such data in an uncorrected data database 252. By way of illustration, the uncorrected data may include uncorrected measured (or simulated) data such as, for example, data illustrated by the curves 102, 112, and 122 of FIGS. 1A, 1B, and 1C, respectively. Also, by way of example, the system 250 may include a network interface suitable for coupling to a network via a wired or wireless connection. Thus, in various cases, the received uncorrected data (block 202) may be retrieved over such a network connection via the network interface.

The method 200 proceeds to block 204 where the received uncorrected data is organized. In some embodiments, as described below, data organization may include a sorting algorithm that efficiently retrieves neighboring data points. In various embodiments, such organization/sorting may be accomplished at least in part by construction of a directed acyclic graph, as discussed below. With reference to FIG. 2B, and in an embodiment of block 204, the received uncorrected data may be organized by a data organization engine 254 of the system 250. In some embodiments, the data organization engine 254 is coupled to the uncorrected data database 252 from which it may receive the uncorrected data. As discussed in more detail below, the data organization engine 254 may be configured to construct a DAG such as, for example, DAG 300, DAG 900, or DAG 1000 of FIGS. 3, 9, and 10, respectively. The method 200 then proceeds to block 206 where the organized/sorted measurement (or simulation) data is corrected, for example, by way of one or more applied rules. For example, in an embodiment of block 206, the system 250 may further include a rule-based correction engine 256 coupled to the data organization engine 204 to receive organized/sorted data therefrom, where the rule-based correction engine 256 is configured to perform a rule-based data correction of the organized/sorted data. Thus, in various embodiments, after the system 250 receives the uncorrected data, which may be stored in the uncorrected data database 252, and organizes/sorts the data by way of the data organization engine 254, the rule-based correction engine 256 may be employed to correct one or more data sets in accordance with one or more defined rules. The method 200 proceeds to block 208 where the corrected data is stored. By way of illustration, the corrected data may include data such as the corrected data illustrated by the curves 104, 114, and 124 of FIGS. 1A, 1B, and 1C, respectively. In an embodiment of block 208, and with reference to FIG. 2B, corrected data (e.g., generated by the rule-based correction engine 256) may be stored in a corrected data database 258 of the system 250, where the corrected data database 258 is coupled to the rule-based correction engine 256.

In addition, software or instructions for performing one or more of the methods described herein may be stored on a computer-readable medium (e.g., local to the system 250 or at a remote location accessible via the network interface of the system 250), and executed by one or more processors of the system 250. One of skill in the art in possession of the present disclosure will also recognize that the system 250 may be implemented by any of a plurality of systems (e.g., such as the computer system 1300 illustrated in FIG. 13) located at any of a variety of physical locations. For purposes of illustration, and merely as one example, the system 250 may be implemented by a computer system in a semiconductor fabrication facility (e.g., operated by a process engineer), where the process engineer is collecting measured parametric data (e.g., via a computer system) that needs to be corrected. In some cases, the system 250 may be implemented by a computer system in a design center (e.g., operated by a design engineer), where the computer system is executing device and/or circuit simulations and thereby generating simulated data that needs to be corrected. As such, in some embodiments, raw data (i.e., uncorrected data) may be generated from a device and/or circuit simulation corresponding to physical electrical measurements of an electronic component and/or electronic circuit. In some embodiments, such simulated data may include timing values, power consumption values, or other electronic component or circuit-related characteristics as known in the art. By way of example, corrected simulation data (e.g., such as corrected timing values, corrected power consumption values, etc.), as provided by the system 250, may be used in a data book/datasheet for a given electronic component and/or circuit. Thus, in various embodiments, a designer may use the corrected data (e.g., as recorded in a data book/datasheet) to design an electronic component and/or an electronic circuit. Those of skill in the art in possession of the present disclosure will recognize other computer systems, users, locations, and/or applications in which the system 250 may be implemented.

Figure 3:
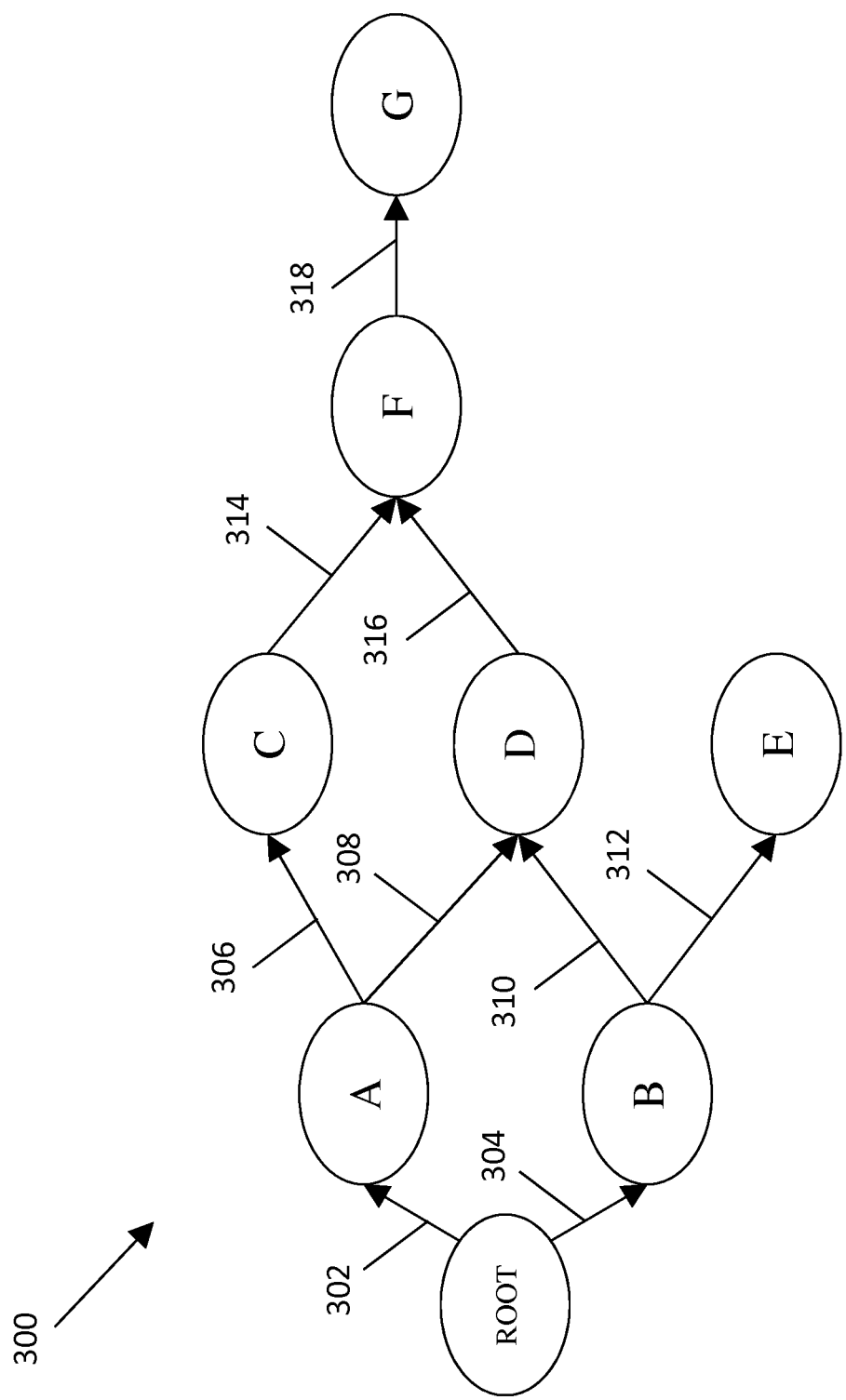
FIG. 3 is a schematic view of a directed acyclic graph (DAG) constructed in accordance with some embodiments.

As discussed above, embodiments of the present disclosure provide for efficient retrieval of neighboring measurement values by construction of a directed acyclic graph (DAG), for example by way of the data organization engine 254 (FIG. 2B). Construction and use of a DAG, in the present embodiments, provides for gathering of all neighboring data points with a single access of measured (or simulated) data. For purposes of clarity of discussion prior to discussing DAG construction, and with reference to FIG. 3, illustrated therein is an embodiment of a DAG 300 which may have been constructed by, and which may be used for, one or more of the methods disclosed herein. As illustrated, DAG 300 does not contain any directed cycles (i.e., loops). DAG 300, as shown in FIG. 3, includes a plurality of nodes A, B, C, D, E, F, and G, as well as a Root Node. The nodes are coupled to one another by way of directed edges (i.e., directed paths) 302, 304, 306, 308, 310, 312, 314, 316, and 318. In particular, in the present example, the Root Node is coupled to node A by edge 302 and to node B by edge 304. Node A is coupled to node C by edge 306 and to node D by edge 308. Node B is coupled to node D by edge 310 and to node E by edge 312. Node C is coupled to node F by edge 314 and node D is coupled to node F by edge 316. Lastly, node F is coupled to node G by edge 318. As illustrated, all edges are contained in a path originating at the Root Node and terminating at one or more sinks (i.e., a node having no exiting edges). Thus, in the example of FIG. 3, nodes E and G may be labeled as sink nodes. In various embodiments, the directed edges may represent relationships between nodes. By way of example, nodes A and C, connected by edge 306 may indicate that node A is less than node C. Similarly, node A may be less than node D. Thus, in some embodiments, node B may be less than nodes D and E, nodes C and D may be less than node F, and node F may be less than node G. To be sure, and as discussed in more detail below, 'a first node less than a second node' does not necessarily imply that 'the second node is greater than the first node'. In various embodiments, construction of a DAG (e.g., DAG 300), including node and edge positions in accordance to embodiments of the present disclosure, is determined by an ordering function such as discussed with reference to FIG. 6. Additional details of DAG construction are discussed below. As described above, each node may also include a list of predecessor nodes (i.e., a predecessor list) and a list of successor nodes (i.e., a successor list), which provides for efficient collection of all neighboring data points (e.g., of a particular data point) by traversing the predecessor/successor lists of a particular node.

Figure 4:
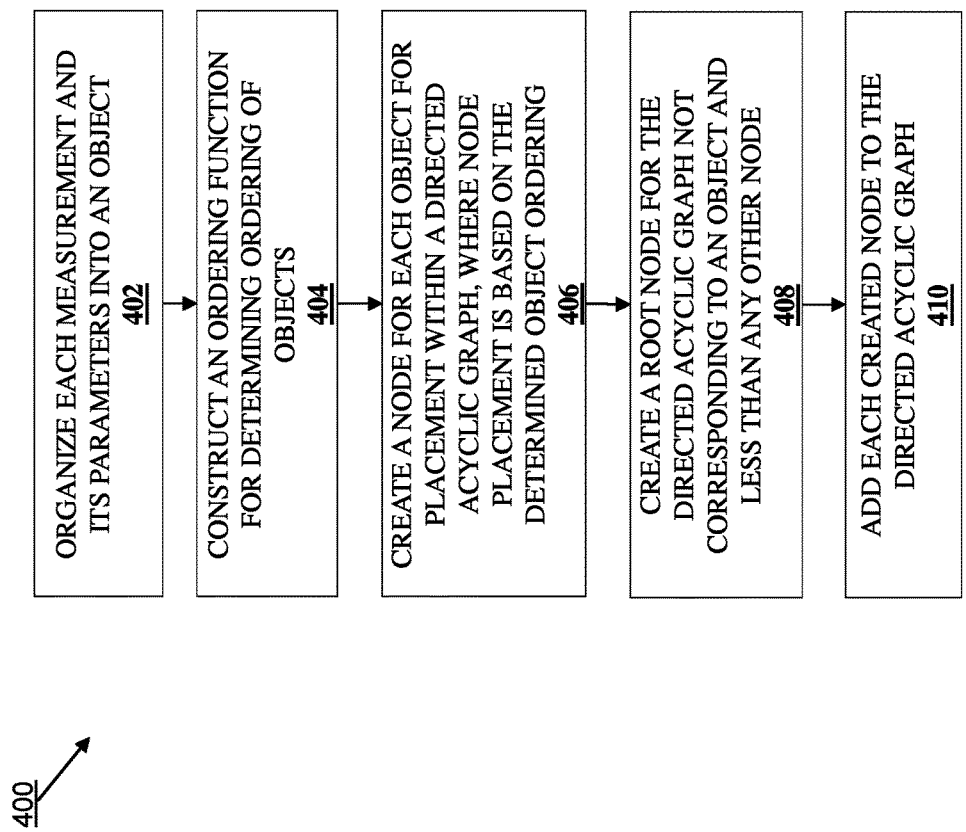
FIG. 4 is a flow chart illustrating an embodiment of a method for constructing a DAG.
Figure 8:
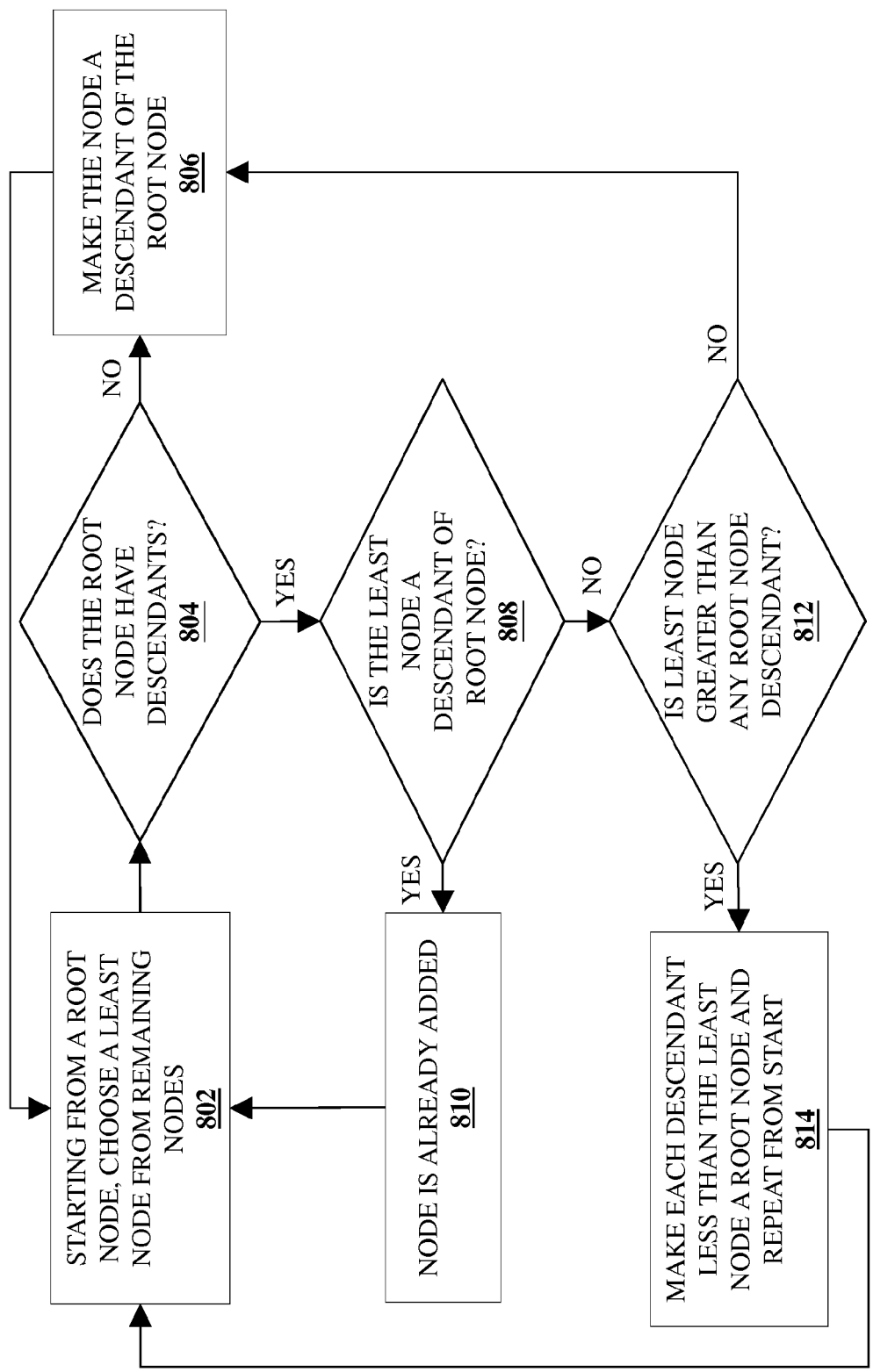
FIG. 8 is a flow chart illustrating an embodiment of a method for adding nodes to a DAG.

Referring now to FIG. 4, illustrated is a method 400 of constructing a directed acyclic graph (DAG), in accordance with embodiments of the present disclosure. In some embodiments, construction of the DAG by the method 400 may be accomplished by way of the data organization engine 254, described above. In particular, in various embodiments, the method 400 may be used to construct a DAG such as the DAG 300 shown in FIG. 3, as well as DAG 900 and DAG 1000 described below with reference to FIGS. 9 and 10. One or more aspects discussed above with reference to the method 200 and the system 250 of FIGS. 2A/2B may also apply to the method 400. Moreover, it is noted that the steps of method 400, including any descriptions given with reference to FIGS. 3-10, are merely exemplary and are not intended to be limiting beyond what is specifically recited in the claims that follow. Further, it is understood that the method 400 may include fewer or additional steps than those recited. Also, the steps recited need not necessarily be performed in a specific order. Any order of steps recited is simply for exemplary purposes and should not be considered limiting.

The method 400 begins at block 402 where each measurement (or simulation), and its respective parameters, are organized into an object. With reference to FIG. 5, and in an embodiment of block 402, an object 502 including a plurality of parameters is illustrated. As used herein, an "object" may include a data structure (e.g., an array stored in a memory of the system 250), where the object is used to represent a particular measurement (or simulation). In various embodiments, an object (e.g., the object 502) includes a list of parameters for a particular measurement (or simulation). By way of example, and as shown in FIG. 5, the object 502 may include a first parameter (P1) equal to 'A', a second parameter (P2) equal to 'B', and an Nth parameter (PN) equal to 'N'. In some embodiments, each parameter (e.g., parameters 'A', 'B', and 'N') has a single value associated with its respective object, and during comparison (i.e., ordering) of objects, as discussed below, such parameter values are compared to one another. For purposes of illustration, and returning to the semiconductor device leakage current example discussed above, the first parameter (P1) may include a temperature value and the second parameter (P2) may include a voltage value. Thus, in this example, a leakage current measurement (and its temperature and voltage parameters) may be organized into object 502, for example, by the data organization engine 254.

The method 400 proceeds to block 404 where an ordering function, for determining an order of objects, is constructed. In some embodiments, the order of objects is used to determine a placement of nodes, each node corresponding to a given object, within a subsequently constructed DAG. Additionally, in various embodiments, the ordering function described herein may be constructed and/or implemented by the data organization engine 254. In some embodiments, the constructed ordering function may include a function defined as Ord(A,B). By way of example, the ordering function Ord(A,B) takes two objects (A,B) as inputs and returns TRUE if a theoretical (or measured) measurement value of object 'A' is greater than a theoretical (or measured) measurement value of object 'B', otherwise it returns FALSE. Thus, object 'A' is greater than object 'B' if Ord(A,B) is TRUE. Stated another way, if object 'A' is greater than object 'B', then object 'B' is less than object 'A'. However, it should be noted that if Ord(A,B) returns FALSE, it does not necessarily mean object 'B' is greater than object 'A', as will be described in further detail below. While a particular example of an ordering function has been given, it will be understood by those skilled in the art that other ordering functions may equally be used without departing from the scope of the present disclosure.

As a specific example of an implementation of the ordering function Ord(A,B), consider two objects 'A' and 'B' that each represent a leakage current measurement (or simulation) and each include first and second parameters P1, P2 including a temperature value and voltage value, respectively. Now, consider that the leakage current measurement objects 'A' and 'B' are to be ordered using an ordering function, such as the ordering function Ord(A,B). With reference to FIG. 6, the ordering function Ord(A,B) may be implemented as shown by source code 600. In various embodiments, object ordering (e.g., as provided by the source code 600) is performed by the data organization engine 204 (FIG. 2). In the example of FIG. 6, the exemplary source code 600 provides an illustration of an ordering function Ord(A,B) that may be used to order objects representing a device leakage current, such as objects 'A' and 'B'. However, it will be understood that other ordering functions, which may be used for ordering of any of a variety of measurement and/or simulation data, may equally be defined while remaining within the scope of the present disclosure. With respect to the device leakage current example, it is known in the art that semiconductor device leakage current is positively correlated to both temperature and voltage (i.e., leakage current increases for both temperature and voltage). Thus, as shown in line 605 of the source code 600, if a temperature value of object 'A' (i.e., parameter P1 of object 'A') is greater than a temperature value of object 'B' (i.e., parameter P1 of object 'B') ($t_a > t_b$) and a voltage value of object 'A' (i.e., parameter P2 of object 'A') is greater than a voltage value of object 'B' (i.e., parameter P2 of object 'B') ($v_a > v_b$), then Ord(A,B) returns TRUE (line 610 of the source code 600), otherwise Ord(A,B) returns FALSE (line 615 of the source code 600). To be sure, as stated above, if Ord(A,B) returns FALSE, it does not necessarily mean that object 'B' is greater than object 'A'. For instance, if a voltage value of object 'A' is less than a voltage value of object 'B' ($v_a < v_b$), while a temperature value of object 'A' is greater than a temperature value of object 'B' ($t_a > t_b$), it does not necessarily follow that a theoretical (or measured) measurement value of object 'B' is greater than that of object 'A'. Thus, in such a situation, a more appropriate statement is that object 'A' is not greater than object 'B'.

The method 400 proceeds to block 406 where a node is created for each object (e.g., object 'A' and object 'B'). In various embodiments, each created node is placed within a constructed DAG (the nodes connected by directed edges) based on the order of the object to which the node corresponds, as determined by the ordering function (block 404) and implemented by the data organization engine 204. With reference to FIG. 7, and in an embodiment of block 406, a node 702 is illustrated. In various embodiments, the node 702 corresponds to an object such as object 502 (FIG. 5). As shown, and in some embodiments, the node 702 includes a plurality of parameters, which may include the same plurality of parameters as the object (e.g., object 502) to which it corresponds. Thus, considering the example where the node 702 corresponds to the object 502, the node 702 may also include the first parameter (P1) equal to 'A', the second parameter (P2) equal to 'B', and the Nth parameter (PN) equal to 'N'. Additionally, each node (e.g., the node 702) may include a list of predecessor nodes (i.e., a predecessor list), as illustrated in FIG. 7 by "PRE= . . . " and a list of successor nodes (i.e., a successor list) as shown by "SUC= . . . " As described above, a predecessor list of a particular node may include all nodes contained within a path between the root node and the particular node, and a successor list of the particular node may include all nodes contained within a path between the particular node and a sink node. In some embodiments, the predecessor and successor lists are empty before the DAG is constructed. In some cases, the predecessor and successor lists are populated during DAG construction. In some embodiments, the predecessor and successor lists are populated after DAG construction is complete. In any case, in various embodiments of block 406, a complete set of nodes corresponding to a plurality of objects is created. In an additional embodiment of block 406, one or more created nodes may include a 'least node' identifier, where the least node identifier is used to indicate a node that is not greater than any other node. In some embodiments, the least node identifier is used to indicate a node that is not greater than any other node, and which has not already been added to the DAG. Such 'least node' identification may be accomplished by the data organization engine 254 (e.g., by way of the ordering function).

Figure 9:
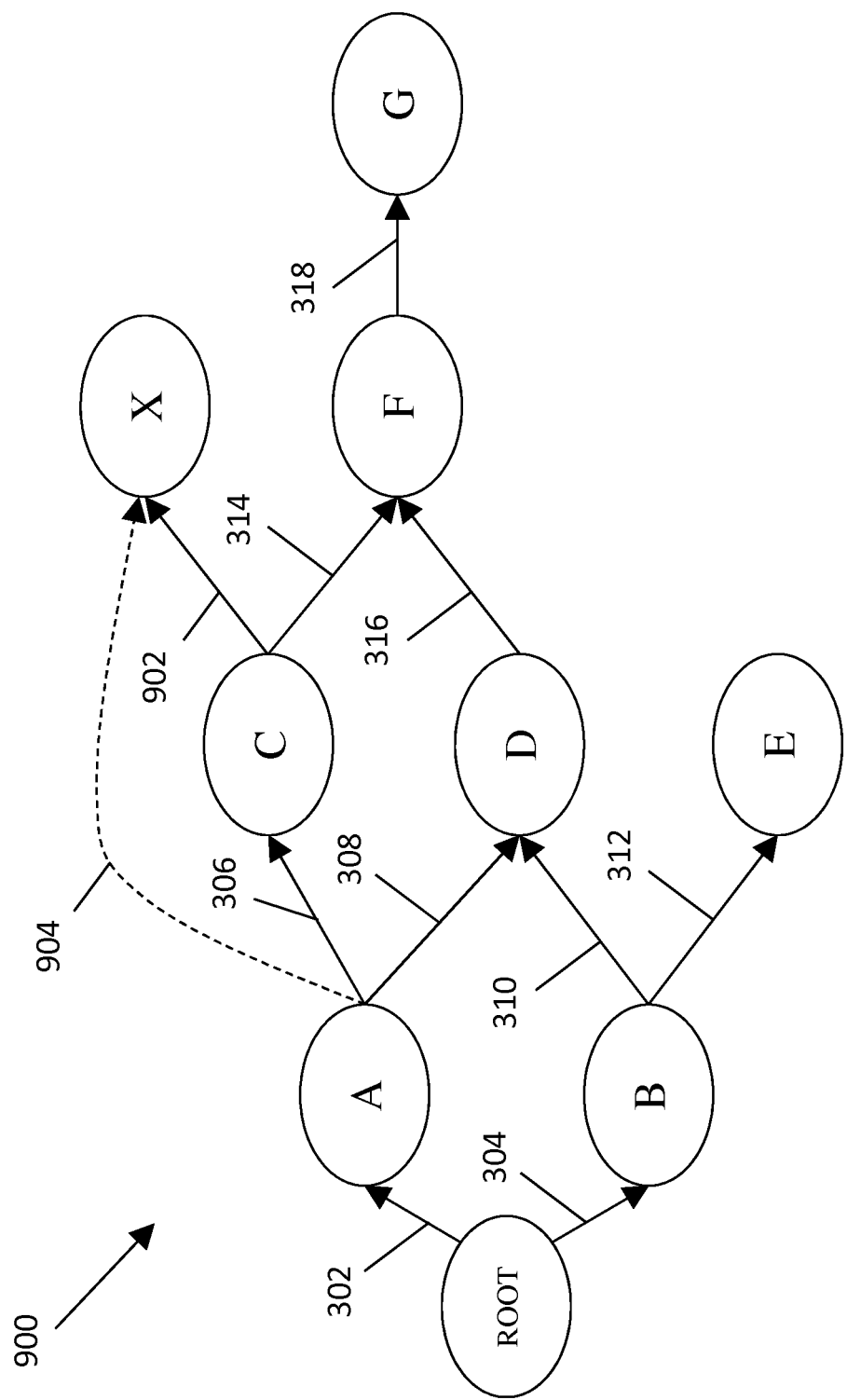
FIG. 9 is a schematic view of the DAG of FIG. 3 and illustrating the addition of a new node and a new edge, in accordance with some embodiments.
Figure 10:
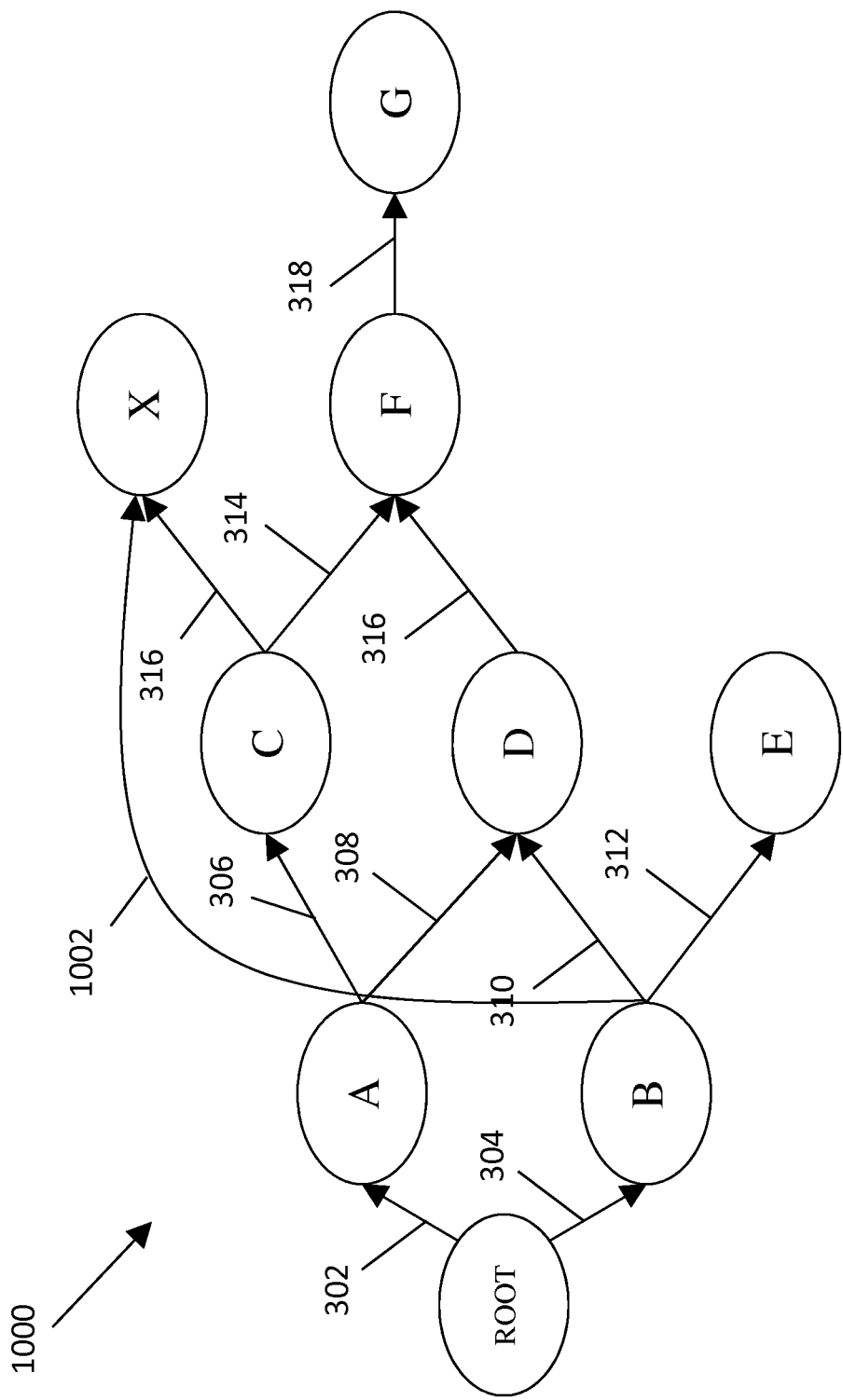
FIG. 10 is a schematic view of the DAG of FIG. 9 and illustrating the addition of an additional edge, in accordance with some embodiments.

The method 400 proceeds to block 408 where a root node is created. In various embodiments, the root node does not correspond to any object, unlike the nodes created at block 406. Additionally, in some embodiments, the root node is less than any other node. Stated another way, Ord(ROOT,X), where 'ROOT' corresponds to the root node and 'X' corresponds to any other node, will always return FALSE. It should be noted that the root node created in block 408 may be designated as a primary root node, where DAG construction begins at the primary root node. As discussed in more detail below with reference to FIG. 8, during DAG construction (including adding new nodes) other nodes may be temporarily designated as root nodes. For purposes of discussion, and in some embodiments, such temporary root nodes may be designated as pseudo root nodes. However, in various embodiments, there may be only one primary root node from which DAG construction begins. With nodes created, including a root node (i.e., a primary root node), the method 400 proceeds to block 410 where each node is added to the DAG (i.e., the DAG is constructed). Details of adding nodes to the DAG (e.g., block 410) may be better understood with reference to FIG. 8, which illustrates a method for adding nodes to the DAG. In some embodiments, the method 800 may be accomplished by way of the data organization engine 254, described above. In particular, in various embodiments, the method 800 may be used (e.g., in conjunction with the method 400) to construct a DAG such as the DAG 300 shown in FIG. 3, as well as DAG 900 and DAG 1000 described below with reference to FIGS. 9 and 10. One or more aspects discussed above with reference to the method 200 and the system 250 of FIGS. 2A/2B may also apply to the method 800. Moreover, it is noted that the steps of method 800, including any descriptions given with reference to FIGS. 3, 9, and 10, are merely exemplary and are not intended to be limiting beyond what is specifically recited in the claims that follow. Further, it is understood that the method 800 may include fewer or additional steps than those recited. Also, the steps recited need not necessarily be performed in a specific order. Any order of steps recited is simply for exemplary purposes and should not be considered limiting.

The method 800 begins at block 802 where starting from a root node, a least node is chosen from among any remaining nodes. For purpose of illustration, construction of the DAG 300 is now discussed below. It will be understood that the following discussion regarding the construction of DAG 300 is merely exemplary, and is not meant to be limiting in any way beyond what is recited in the claims that follow. Additionally, it will be understood that various implementations of constructing the DAG 300 may be alternately employed without departing from the scope of the present disclosure. With reference to the example of FIG. 3, consider that the illustrated Root Node is a primary root node, as discussed above, where DAG construction begins. In addition, by way of example, consider that the data organization engine 254 (e.g., by way of the ordering function) has determined (e.g., by comparison of their corresponding objects) that node A is less than nodes C and D, node B is less than nodes D and E, nodes C and D are less than node F, and node F is less than node G. Additionally, the data organization engine 254 may have determined that nodes A and B are not less than or greater than each other (thus nodes A and B have the same rank), and that nodes C, D, and E are not greater than or less than one other (thus nodes C, D, E have the same rank).

Thus, in an embodiment of block 802 and assuming that DAG construction begins at the labeled Root Node (i.e., primary root node) of FIG. 3, one of the two available least nodes A, B may be chosen first. By way of example, consider that node A is chosen first. In some embodiments, selection of one of a plurality of available least nodes (e.g., least nodes A, B) may be handled by the data organization engine 254. The method then proceeds to block 804 where it is determined whether the Root Node (i.e., the primary root node) has any descendant nodes. Since the method 800 began only with the Root Node, the Root Node is determined not to have any descendants initially, and the method 800 proceeds to block 806 where the node (i.e., selected least node A) is made a descendant of the Root Node (i.e., the primary root node). In some embodiments, the Root Node (i.e., primary root node) is added to the predecessor list (e.g., as shown in FIG. 7) of the selected least node A, and the selected least node A is added to the successor list (e.g., as shown in FIG. 7) of the Root Node (i.e., the primary root node).

In various embodiments, the method 800 returns to block 802 where returning to the Root Node (i.e., the primary root node) a least node is selected from the remaining nodes. The "remaining nodes", as used herein, may include available least nodes which have not yet been added as descendants of the currently selected root node (e.g., primary or pseudo root node). Thus, in the present example of DAG 300, node B may be chosen next. The method then proceeds to block 804 where it is determined that the Root Node (still the primary root node) has a descendant node (i.e., node A). Thus, the method 800 proceeds to block 808 where it is determined whether the next selected least node (i.e., node B) is already a descendant of the Root Node (still the primary root node). Since node B is not yet a descendant of the Root Node, the method 800 proceeds to block 812 where it is determined if the selected least node (i.e., node B) is greater than any Root Node descendant (i.e., node A). Since node B is not greater than any Root Node descendant (i.e., node A), the method 800 proceeds to block 806 where node B is made a descendant of the Root Node (i.e., still the primary root node). In some embodiments, the Root Node (i.e., primary root node) is added to the predecessor list of the selected least node B, and the selected least node B is added to the successor list of the Root Node (i.e., the primary root node).

The method 800 returns to block 802 where returning to the Root Node (i.e., the primary root node) a least node is selected from the remaining nodes (i.e., nodes which have not yet been added to the DAG as Root Node descendants). Thus, consider that the next least node chosen is node C. The method proceeds to block 804 where it is determined that the Root Node (still the primary root node) has two descendant nodes (i.e., nodes A and B). The method 800 then proceeds to block 808 where it is determined whether the next selected least node (i.e., node C) is already a descendant of the Root Node (still the primary root node). Since node C is not yet a descendant of the Root Node, the method 800 proceeds to block 812 where it is determined if the selected least node (i.e., node C) is greater than any Root Node descendant (i.e., nodes A or B). Since node C is greater than nodes A and B (or rather, nodes A and B are not greater than node C), the method 800 proceeds to block 814 where each descendant node less than selected least node C (i.e., nodes A and B) are designated as 'root nodes'. In this case, newly designated root nodes A and B may be pseudo root nodes (as opposed to the labeled Root Node of FIG. 3, which is the primary root node).

The method 800 then returns to block 802 where starting from a root node (i.e., a pseudo root node A or B), a least node is chosen (i.e., node C) from the remaining nodes (i.e., nodes C or D, which have not yet been added to the DAG as pseudo root node descendants). Consider that pseudo root node A is chosen first. The method then proceeds to block 804 where it is determined that the root node (i.e., pseudo root node A) does not yet have descendants, thus the method 800 proceeds to block 806 where the selected least node (i.e., node C) is made a descendant of the root node (i.e., pseudo root node A). In some embodiments, the pseudo root node (i.e., node A) is added to the predecessor list of the selected least node C, and the selected least node C is added to the successor list of both the pseudo root node (i.e., node A) and the primary root node.

The method 800 then returns to block 802 where starting from a root node (i.e., pseudo root node A), a least node is chosen (i.e., node D) from the remaining nodes. The method then proceeds to block 804 where it is determined that the root node (i.e., pseudo root node A) has a descendant (i.e., node C). Thus, the method 800 proceeds to block 808 it is determined that the least node (i.e., node D) is not a descendant of the root node (i.e., pseudo root node A). Next, proceeding to block 812, it is determined that the least node (i.e., node D) is not greater than any root node (i.e., pseudo root node A) descendant (i.e., node C). Thus, the method 800 proceeds to block 806 where the least node (i.e., node D) is made a descendant of the root node (i.e., pseudo root node A). In some embodiments, the pseudo root node (i.e., node A) is added to the predecessor list of the selected least node D, and the selected least node D is added to the successor list of both the pseudo root node (i.e., node A) and the primary root node.

In some embodiments, DAG construction may continue with addition of more pseudo root node A descendants (e.g., nodes F and G). In some cases, DAG construction may alternately continue with addition of available root nodes to any other root nodes (e.g., pseudo root node B) prior to adding nodes F and G. In the present example, consider that the method 800 proceeds again to block 802 and starts from the next root node (i.e., pseudo root node B), where a least node is chosen (i.e., node D) from the remaining nodes (i.e., nodes D or E, which have not yet been added as descendants of the currently selected pseudo root node B). The method then proceeds to block 804 where it is determined that the root node (i.e., pseudo root node B) does not yet have descendants, thus the method 800 proceeds to block 806 where the selected least node (i.e., node D) is made a descendant of the root node (i.e., pseudo root node B). In some embodiments, the pseudo root node (i.e., node B) is added to the predecessor list of the selected least node D, and the selected least node D is added to the successor list of both the pseudo root node (i.e., node B) and the primary root node.

The method 800 proceeds to block 802 where starting from the root node (i.e., pseudo root node B), the next available least node is chosen (i.e., node E) from the remaining nodes. The method then proceeds to block 804 where it is determined that the root node (i.e., pseudo root node B) has a descendant (i.e., node D). Thus, the method 800 proceeds to block 808 where it is determined that the least node (i.e., node E) is not a descendant of the root node (i.e., pseudo root node B). Next, proceeding to block 812, it is determined that the least node (i.e., node E) is not greater than any root node (i.e., pseudo root node B) descendant (i.e., node D). Thus, the method 800 proceeds to block 806 where the least node (i.e., node E) is made a descendant of the root node (i.e., pseudo root node B). In some embodiments, the pseudo root node (i.e., node B) is added to the predecessor list of the selected least node E, and the selected least node E is added to the successor list of both the pseudo root node (i.e., node B) and the primary root node.

The method 800 returns to block 802 where returning to the root node (i.e., pseudo root node B), the next available least node is chosen (i.e., node F). The method proceeds to block 804 where it is determined that the root node (e.g., the pseudo root node B) has two descendant nodes (i.e., nodes D and E). The method 800 then proceeds to block 808 where it is determined whether the next available least node (i.e., node F) is already a descendant of the root node (i.e., pseudo root node B). Since node F is not yet a descendant of the pseudo root node, the method 800 proceeds to block 812 where it is determined that the selected least node (i.e., node F) is greater than pseudo root node descendants (e.g., nodes C, D, E). Since node F is greater than nodes C, D, E (or rather, nodes C, D, E are not greater than node F), the method 800 proceeds to block 814 where each descendant node less than selected least node F (i.e., nodes C, D, E) are newly designated as root nodes (i.e., pseudo root nodes C, D, E).

The method 800 then returns to block 802 where starting from a root node (i.e., a pseudo root node C, D, E), a least node is chosen (i.e., node F). Consider that pseudo root node C is chosen first. The method then proceeds to block 804 where it is determined that the root node (i.e., pseudo root node C) does not yet have descendants, thus the method 800 proceeds to block 806 where the selected least node (i.e., node F) is made a descendant of the root node (i.e., pseudo root node C). In some embodiments, the pseudo root node (i.e., node C) is added to the predecessor list of the selected least node F, and the selected least node F is added to the successor list of the pseudo root nodes C and A, as well as the primary root node.

The method 800 returns to block 802 where starting from a next root node (i.e., pseudo root node D), a least node is chosen (i.e., node F). The method then proceeds to block 804 where it is determined that the root node (i.e., pseudo root node D) does not yet have descendants, thus the method 800 proceeds to block 806 where the selected least node (i.e., node F) is made a descendant of the root node (i.e., pseudo root node D). In some embodiments, the pseudo root node (i.e., node D) is added to the predecessor list of the selected least node F, and the selected least node F is added to the successor list of the pseudo root node D (node F may have already been added to the successor list of the pseudo root node A and the primary root node, as described above). Embodiments of the present disclosure provide for avoiding multiple addition of the same descendant node to a given root node. For example, if node F is already added as a descendant of pseudo root node D, and node F is selected again as the next available least node, the method 800 (at block 808) will detect that the selected least node (e.g., node F) has already been added to the root node (e.g., pseudo root node D) at block 810. In some embodiments, the method 800 may then return to block 802.

Returning to the root node (e.g., pseudo root node D), at block 802, the next available least node is chosen (i.e., node G). The method proceeds to block 804 where it is determined that the root node (e.g., the pseudo root node D) has a descendant node (i.e., node F). The method 800 then proceeds to block 808 where it is determined whether the next available least node (i.e., node G) is already a descendant of the root node (i.e., pseudo root node D). Since node G is not yet a descendant of the pseudo root node, the method 800 proceeds to block 812 where it is determined that the selected least node (i.e., node G) is greater than pseudo root node descendant (e.g., node F). Since node G is greater than node F (or rather, node F is not greater than node G), the method 800 proceeds to block 814 where each descendant node less than selected least node G (i.e., node F) is newly designated as a root nodes (i.e., pseudo root node F).

The method 800 then returns to block 802 where starting from a root node (i.e., pseudo root node F), a least node is chosen (i.e., node G). The method then proceeds to block 804 where it is determined that the root node (i.e., pseudo root node F) does not yet have descendants, thus the method 800 proceeds to block 806 where the selected least node (i.e., node G) is made a descendant of the root node (i.e., pseudo root node F). In some embodiments, the pseudo root node (i.e., node F) is added to the predecessor list of the selected least node G, and the selected least node G is added to the successor list of the pseudo root nodes F, C, D, A, as well as the primary root node.

As a general summary DAG construction in accordance with embodiments of the present disclosure, first a DAG root node is created (e.g., a primary root node). An available least node is selected (e.g., node B) and compared it to all the other nodes connected to the root node by an edge (e.g., node A). If and only if the selected least node (e.g., node B) is not greater than any of the other nodes connected to the root node (e.g., node A), then the selected least node (e.g., node B) is connected to the root node by an edge. The root node is added to the predecessor list of the selected least node (e.g., node B), and the selected least node (e.g., node B) is added to the successor list of the root node. As described above, nodes connected to the root node are called descendants of the root node. Additionally, if the selected least node already exists as one of the descendants of the root node, the selected least node will not be connected (to the root node) again.

For each descendant node of the root node (e.g., nodes A and B) which is less than the next available least node (e.g., nodes C, D, E), the descendant nodes (e.g., nodes A and B) may be considered as root nodes (e.g., pseudo root nodes as discussed above), and the process of adding a next least node is repeated. In various embodiments, if a descendant node was previously processed during the addition of current next least node, the descendant node is not processed again. In various examples, the process ends for example, when there are no further actions that may be taken (as there are only a finite number of nodes in the graph and the graph is acyclic). The methods described herein provide that all the ordering sequences can be found by traversing the constructed DAG (e.g., DAG 300). In particular, all the neighboring objects of a particular object can be read off the predecessor list and successor list of its corresponding node.

As another illustration, and with reference to the example of FIG. 9, the method 800 may be used (e.g., in conjunction with the method 400) to construct a DAG such as the DAG 900. DAG 900, as shown, is similar to DAG 300 of FIG. 3; however, DAG 900 includes additional node X. By way of example, consider that the data organization engine 254 (e.g., by way of the ordering function) has determined (e.g., by comparison of their corresponding objects) that node X is less than nodes D and F, but greater than node C (i.e., node C is not greater than node X). In some embodiments, directed edge 902 is created to indicate that node C is not greater than node X. In various embodiments, directed edge 904 is not created because node X is inserted to the DAG 900 at a successor to node A (i.e., node C). Thus, in some embodiments, a node (e.g., node X) may not be made a direct descendant of an ancestor node (e.g., node A) if it is already made a direct descendant of a descendant of the ancestor node (e.g. node C). In some embodiments, node C is added to the predecessor list of node X, and node X is added to the successor list of node C.

As yet another illustration, and with reference to the example of FIG. 10, the method 800 may be used (e.g., in conjunction with the method 400) to construct a DAG such as the DAG 1000. DAG 1000, as shown, is similar to DAG 900 of FIG. 9; however, for the example of DAG 1000 consider that the data organization engine 254 has now determined that node X is less than node E, but greater than node B (i.e., node B is not greater than node X). In some embodiments, directed edge 1002 is created to indicate that node B is not greater than node X. In some embodiments, node B is added to the predecessor list of node X, and node X is added to the successor list of node B.

Referring now to FIGS. 11 and 12, shown therein are embodiments of source code 1100, 1200 for constructing a DAG according to one or more aspects of the present disclosure. For example, lines 1105-1120 provide instructions (e.g., to the data organization engine) indicating that for each 'starting' node (i.e., primary root node or pseudo root node), search for and add new nodes to the DAG, for example as defined by the call to "addNewNodeToDAG" at line 1120. In some embodiments, the node to be added is "NewNode", for example, as shown in line 1120. In some examples, "StartNodeArray", as shown in line 1105, contains all nodes that are direct descendants of the root node of the DAG. In some cases, if the new node (i.e., "NewNode") cannot be inserted into any of the DAGs spanned by nodes in "StartNodeArray", then the new node is made a direct descendant of the root node by adding it to "StartNodeArray". Source code 1200 provides an example of code used for adding a new node to the DAG rooted at the node "root". In the present example, source code 1200 provides an example of "addNewNodeToDAG" called at line 1120 of source code 1100. In some embodiments, the new root is inserted into sub-DAGs rooted at "node" if the new root is greater than it (i.e., greater than "node"). In some cases, the new node is made a direct descendant of "root" if no such node can be found. It is to be understood that these simply are exemplary blocks of source code and should not be considered limiting as to the data organization methods described herein. Numerous other blocks of source code, including various programming languages, may be used without departing from the scope of the present disclosure.

Figure 13:
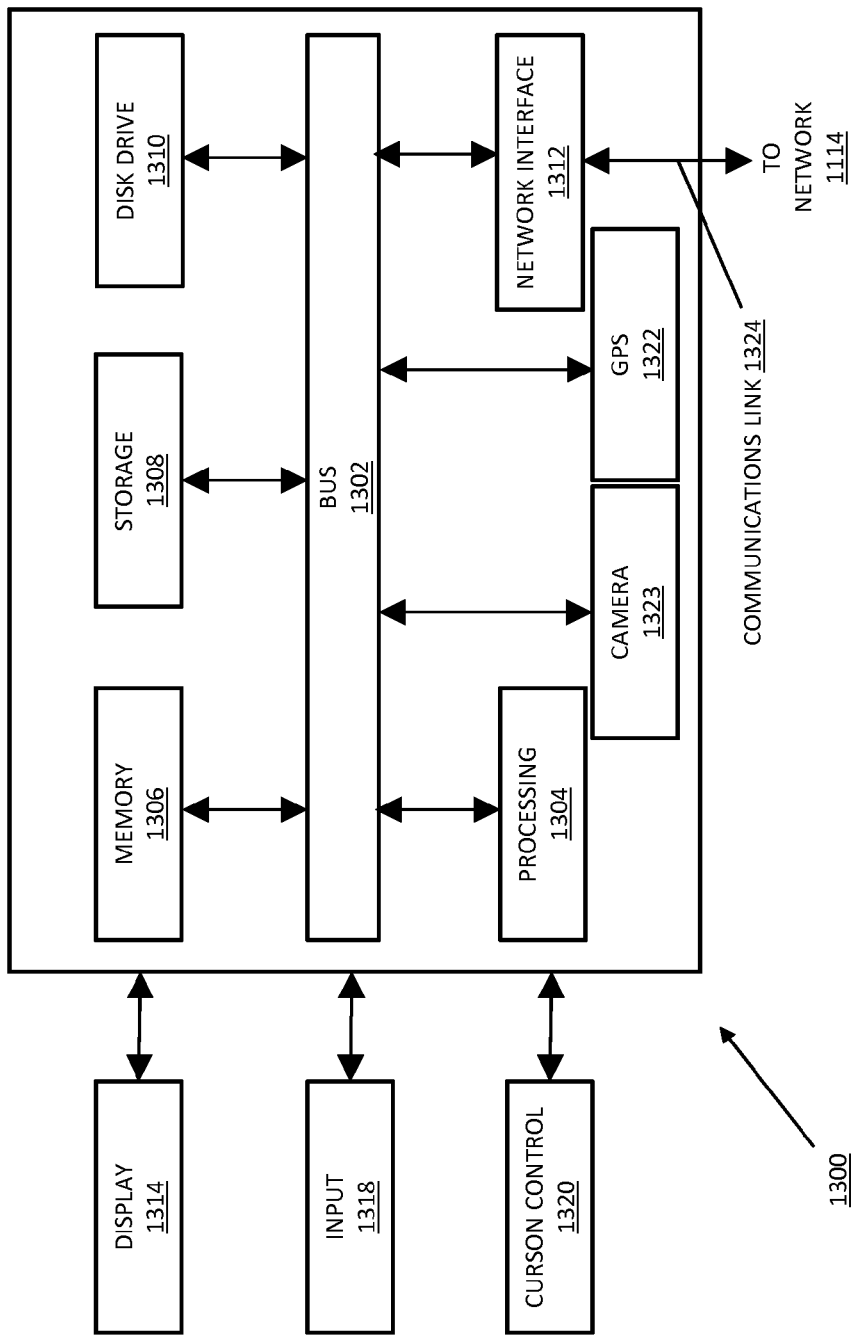
FIG. 13 is a schematic view illustrating an embodiment of a computer system.

Referring now to FIG. 13, an embodiment of a computer system 1300 suitable for implementing, for example, the system 250 and methods 400, 800, is illustrated. It should be appreciated that any of a variety of systems which are used for carrying out the methods described herein, as discussed above, may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the system 250 and methods 400, 800. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to a network (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

With respect to the description provided herein, the present disclosure offers methods and systems for efficient retrieval of neighboring measurement values in order to enable fast execution of rule-based error correction. As described above, such methods may be particularly advantageous when a measurement data sample size is not large enough to successfully employ statistical methods for data correction. In some embodiments, efficient retrieval of neighboring measurement values is accomplished by way of constructing a DAG, which provides for gathering of all neighboring data points with a single access of the measured (or simulated) data. As described herein, a DAG may be used to represent multiple parameter measurement ordering relationships, enabling the efficient data retrieval described above. In various embodiments, each DAG node may include a list of predecessor nodes (i.e., a predecessor list) and a list of successor nodes (i.e., a successor list). Thus, in some embodiments, all node ordering sequences can be found by traversing the constructed DAG. In particular, in accordance with various embodiments, all neighboring objects (e.g., all neighboring data points) of a particular object (e.g., of a particular data point) can be read off the predecessor list and successor list of its corresponding node. Thus, embodiments of the present disclosure provide a DAG for efficient collection of data (including neighboring measurement values), where one or more rules may be applied to such collected data to correct errors. In this manner, an efficient, rules-based method for error correction (e.g., of multiple parameter measurement data) may be provided. Those skilled in the art will recognize other benefits and advantages of the methods and systems as described herein, and the embodiments described are not meant to be limiting beyond what is specifically recited in the claims that follow.

Thus, one of the embodiments of the present disclosure described a method for data normalization using multi-key sorting. In some embodiments, the method includes receiving, by a data organization engine, a set of uncorrected data including corresponding neighboring data. In various embodiments, the data organization engine organizes the uncorrected data by construction of a directed acyclic graph (DAG), where the DAG includes a plurality of nodes. In some embodiments, the data organization engine may traverse the plurality of nodes to retrieve the corresponding neighboring data. Upon retrieval of the neighboring data, a rule-based correction engine may correct the uncorrected data utilizing the retrieved corresponding neighboring data.

In another of the embodiments, discussed is a method for adding nodes to a DAG used for data normalization. In particular, sorting a plurality of multiple parameter measurements including a plurality of neighboring data points is accomplished by construction of a DAG. In some embodiments, the DAG provides for retrieval of the plurality of neighboring data points used for correction of errors within the plurality of multiple parameter measurements. Moreover, in various embodiments, construction of the DAG includes defining a root node, selecting a first least node from a plurality of nodes, connecting the first least node to the root node by a first edge, selecting a second least node from the plurality of nodes, comparing the second least node to the first least node connected to the root node by the first edge, and responsive to a determination that the second least node is not greater than the first least node, connecting the second least node to the root node by a second edge.

In yet another of the embodiments, discussed is a non-transitory machine-readable medium comprising a plurality of machine-readable instructions executable by one or more processors to cause the one or more processors to perform a method for data normalization using multi-key sorting. In some embodiments, the method includes receiving a set of uncorrected data including corresponding neighboring data, organizing the uncorrected data by construction of a DAG including a plurality of nodes, traversing the plurality of nodes to retrieve the corresponding neighboring data, and correcting the uncorrected data utilizing the retrieved corresponding neighboring data.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. It is understood that various different combinations of the above-listed processing steps can be used in combination or in parallel. Also, features illustrated and discussed above with respect to some embodiments can be combined with features illustrated and discussed above with respect to other embodiments. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for data normalization comprising:
   receiving, by a data organization engine, a set of uncorrected data values including corresponding neighboring data values, wherein the set of uncorrected data values correspond to physical electrical measurements of a semiconductor device;
   organizing, by the data organization engine, the uncorrected data values by construction of a directed acyclic graph (DAG) including a plurality of nodes;
   traversing, by the data organization engine, the plurality of nodes to retrieve the corresponding neighboring data values; and
   correcting, by a rule-based correction engine, the uncorrected data values utilizing the retrieved corresponding neighboring data values.

2. The method of claim 1, wherein the set of uncorrected data values further includes data for a plurality of measurement values, and wherein each of the plurality of measurement values depend on a plurality of pre-determined measurement parameters.

3. The method of claim 2, wherein the organizing the uncorrected data values by construction of the DAG further comprises:
   organizing each of the plurality of measurement values and the plurality of pre-determined measurement parameters into a corresponding plurality of objects.

4. The method of claim 3, wherein the organizing the uncorrected data values by construction of the DAG further comprises:
   constructing an ordering function for determination of ordering of the plurality of objects, wherein each of the plurality of nodes corresponds to an object of the plurality of objects, and wherein placement of each of the plurality of nodes within the DAG is based on the determined ordering of the plurality of objects by the ordering function.

5. The method of claim 1, wherein the organizing the uncorrected data values by construction of the DAG further comprises:
   creating a root node from which construction of the DAG is initiated.

6. The method of claim 5, wherein the root node is less than any of the plurality of nodes.

7. The method of claim 1, wherein each of the plurality of nodes includes an associated plurality of measurement parameters, a predecessor list, and a successor list.

8. The method of claim 7, wherein the predecessor list of a particular node of the plurality of nodes includes a list of nodes contained within a path between a root node and the particular node.

9. The method of claim 7, wherein the successor list of a particular node of the plurality of nodes include a list of nodes contained within a path between the particular node and a sink node.

10. The method of claim 1, wherein the correcting the uncorrected data values further comprises:

based on at least one rule and utilizing the retrieved corresponding neighboring data values, correcting the uncorrected data values.

11. A method comprising:
sorting a plurality of multiple parameter measurement values including a plurality of neighboring data points by construction of a directed acyclic graph (DAG), wherein the plurality of multiple parameter measurement values correspond to physical electrical measurements of a semiconductor device, and wherein the DAG provides for retrieval of the plurality of neighboring data points used for correction of data value errors within the plurality of multiple parameter measurement values, and wherein the construction of the DAG comprises:
defining a root node;
selecting a first least node from a plurality of nodes;
connecting the first least node to the root node by a first edge;
selecting a second least node from the plurality of nodes;
comparing the second least node to the first least node connected to the root node by the first edge; and
responsive to a determination that the second least node is not greater than the first least node, connecting the second least node to the root node by a second edge.

12. The method of claim 11, wherein the construction of the DAG further comprises:
responsive to a determination that the second least node is greater than the first least node, defining the first least node as a pseudo root node.

13. The method of claim 11, wherein the construction of the DAG further comprises:
selecting a third least node from the plurality of nodes;
comparing the third least node to the first and second least nodes; and
responsive to a determination that the third least node is greater than at least one of the first and second least nodes, defining the at least one of the first and second least nodes as a pseudo root node.

14. The method of claim 13, wherein the construction of the DAG further comprises:
connecting the third list node to the pseudo root node by a third edge.

15. The method of claim 11, wherein the construction of the DAG further comprises:
responsive to the connecting the first least node to the root node by the first edge, adding the first least node to a successor list of the root node, and adding the root node to a predecessor list of the first least node.

16. The method of claim 11, wherein the DAG provides for retrieval of the plurality of neighboring data points by a single access of the DAG.

17. A non-transitory machine-readable medium comprising a plurality of machine-readable instructions executable by one or more processors to cause the one or more processors to perform a method comprising:
receiving a set of uncorrected data values including corresponding neighboring data values, wherein the set of uncorrected data values correspond to physical electrical measurements of a semiconductor device;
organizing the uncorrected data values by construction of a directed acyclic graph (DAG) including a plurality of nodes;
traversing the plurality of nodes to retrieve the corresponding neighboring data values; and
correcting the uncorrected data values utilizing the retrieved corresponding neighboring data values.

18. The non-transitory machine-readable medium of claim 17, wherein the method further comprises:
constructing an ordering function for determination of ordering of a plurality of objects, wherein each object of the plurality of objects corresponds to a measurement and its associated measurement parameters, wherein each node of the plurality of nodes corresponds to an object of the plurality of objects, and wherein placement of each of the plurality of nodes within the DAG is based on the determined ordering of the plurality of objects by the ordering function.

19. The non-transitory machine-readable medium of claim 18, wherein the method further comprises:
defining a root node;
selecting a first node from the plurality of nodes;
connecting the first least node to the root node by a first edge;
selecting a second least node from the plurality of nodes;
comparing, by the ordering function, the second least node to the first least node connected to the root node by the first edge;
determining, by the ordering function, that the second least node is not greater than the first least node, and connecting the second least node to the root node by a second edge.

20. The non-transitory machine-readable medium of claim 19, wherein the method further comprises:
responsive to the connecting the first least node to the root node by the first edge, adding the first least node to a successor list of the root node, and adding the root node to a predecessor list of the first least node.

21. The method of claim 11, further comprising:
prior to sorting the plurality of multiple parameter measurement values, performing the physical electrical measurements of the semiconductor device.

* * * * *